US010278797B2

(12) United States Patent
Gorans et al.

(10) Patent No.: US 10,278,797 B2
(45) Date of Patent: *May 7, 2019

(54) POULTRY CARRIERS AND METHODS OF RESTRAINING POULTRY

(71) Applicant: Nova-Tech Engineering, LLC, Willmar, MN (US)

(72) Inventors: Marc S. Gorans, Willmar, MN (US); Matthew Henry Erickson, Willmar, MN (US)

(73) Assignee: Nova-Tech Engineering, LLC, Willmar, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/801,778

(22) Filed: Nov. 2, 2017

(65) Prior Publication Data

US 2018/0116776 A1    May 3, 2018

Related U.S. Application Data

(62) Division of application No. 13/142,998, filed as application No. PCT/US2010/021900 on Jan. 23, 2010, now Pat. No. 9,808,328.

(Continued)

(51) Int. Cl.
*A61D 1/00* (2006.01)
*A01K 1/06* (2006.01)
*A61D 3/00* (2006.01)

(52) U.S. Cl.
CPC ............ *A61D 1/005* (2013.01); *A01K 1/0613* (2013.01); *A61D 3/00* (2013.01); *A61D 2003/003* (2013.01); *A61D 2003/006* (2013.01)

(58) Field of Classification Search
CPC ......... A01K 1/0613; A61D 3/00; A61D 1/005
See application file for complete search history.

(56) References Cited

U.S. PATENT DOCUMENTS 3,286,694 A * 11/1966 Landy ............... A61D 3/00
119/755
3,774,578 A * 11/1973 Randolph ........... A01K 37/00
119/714

(Continued)

FOREIGN PATENT DOCUMENTS

FR      2 848 410 A1    6/2004
SU      1 342 492 A1    10/1987
WO   WO 2010/085719 A3   7/2010

OTHER PUBLICATIONS

U.S. Appl. No. 61/146,732, filed Jan. 23, 2009, Gorans et al.

(Continued)

*Primary Examiner* — Michael H Wang
(74) *Attorney, Agent, or Firm* — Mueting, Raasch & Gebhardt, P.A.

(57) ABSTRACT

Bird carriers and methods of restraining birds are disclosed. Each bird carrier may include a torso support, one or more leg clamps, and a head support. The head support may further include a beak receiving passage such that at least a portion of the birds' beaks are exposed. The bird carriers may restrain one or both legs and heads of the birds while supporting their torsos. Restraining the legs and the heads of the birds while supporting their torsos may produce a calming effect such that the birds exhibit significantly reduced struggling in an attempt to free themselves from the carrier.

19 Claims, 9 Drawing Sheets

Related U.S. Application Data

(60) Provisional application No. 61/146,732, filed on Jan. 23, 2009.

(56) References Cited

U.S. PATENT DOCUMENTS

| | | | |
|---|---|---|---|
| 4,003,341 A * | 1/1977 | La Croix | A01K 13/00 |
| | | | 119/756 |
| 4,120,266 A | 10/1978 | Oloff et al. | |
| 4,502,418 A | 3/1985 | Runyan | |
| 4,693,212 A * | 9/1987 | Black | A61D 3/00 |
| | | | 119/755 |
| 5,195,925 A | 3/1993 | Gorans | |
| 5,267,778 A | 12/1993 | Krebs et al. | |
| 5,651,731 A | 7/1997 | Gorans et al. | |
| 5,823,146 A * | 10/1998 | Alaniz | A01K 15/00 |
| | | | 119/725 |
| 7,066,112 B2 | 6/2006 | Gorans | |
| 7,146,936 B2 | 12/2006 | Dazai et al. | |
| 7,232,450 B2 | 6/2007 | Gorans et al. | |
| 7,363,881 B2 | 4/2008 | Gorans et al. | |
| 9,775,695 B2 | 10/2017 | Erickson et al. | |
| 2004/0143278 A1 * | 7/2004 | Gorans | A61D 1/005 |
| | | | 606/164 |
| 2005/0101937 A1 | 5/2005 | Groans et al. | |
| 2005/0115521 A1 * | 6/2005 | Gorans | A61D 1/005 |
| | | | 119/837 |
| 2006/0207519 A1 | 9/2006 | Gorans | |
| 2007/0079766 A1 * | 4/2007 | Park | A01K 13/001 |
| | | | 119/674 |
| 2011/0313409 A1 | 12/2011 | Erickson et al. | |
| 2015/0289475 A1 * | 10/2015 | Stevenson | A01K 1/0613 |
| | | | 119/755 |
| 2017/0265979 A1 | 9/2017 | Erickson et al. | |

OTHER PUBLICATIONS

U.S. Appl. No. 13/142,997, filed Jun. 30, 2011, Erickson et al.
U.S. Appl. No. 15/609,580, filed May 31, 2017, Erickson et al.
International Search Report and Written Opinion issued in the PCT dated Jul. 23, 2010 for PCT/US2010/021900; 8 pgs.
International Preliminary Report on Patentability issued in the PCT dated Aug. 4, 2011 for PCT/US2010/021900; 5 pgs.

* cited by examiner

POULTRY CARRIERS AND METHODS OF RESTRAINING POULTRY

RELATED APPLICATION

The present application is a continuation of U.S. patent application Ser. No. 13/142,998, issued as U.S. Pat. No. 9,808,328 on Nov. 7, 2017, which is the § 371 U.S. National Stage of International Application No. PCT/US2010/021900, filed 23 Jan. 2010, which claims the benefit under 35 U.S.C. § 119 of U.S. Provisional Patent Application No. 61/146,732, titled POULTRY CARRIERS AND METHODS OF TRANSPORTING POULTRY filed on Jan. 23, 2009, which are hereby incorporated by reference in their entireties.

BACKGROUND

Poultry carriers and methods of restraining poultry are described herein.

The processing of poultry may include activities such as sexing to determine gender, inoculating or otherwise medicating the birds, feeding the birds, weighing the birds, treating the beaks and/or claws of the birds (to, e.g., retard their growth), etc. Conventionally, birds are handled manually, i.e., individuals must physically hold the bird and either perform the process while holding the bird or load the bird into equipment in which one of the processes is performed.

In many cases, the birds may be restrained by their heads as described in, e.g., U.S. Pat. No. 5,651,731 (Gorans et al.) with the remainder of the bird being either manually restrained or unrestrained.

SUMMARY

Poultry carriers and methods of atraumatically restraining poultry are described herein. Each carrier may preferably include a torso support, leg clamp apparatus, head clamp, and a head support. The head support may optionally include a beak receiving passage and aperture such that at least a portion of the birds' beaks are exposed.

The bird carriers preferably restrain the legs and heads of the birds while supporting their torsos. Restraining the legs and the heads of the birds while supporting their torsos may produce a calming effect such that the birds may exhibit significantly reduced struggling in an attempt to free themselves from the carrier.

Another potential advantage of restraining the legs and heads of the birds while optionally supporting their torsos is that various anatomical features of the birds can be accurately located with respect to the carrier itself. Accurate positioning of anatomical features of the atraumatically restrained birds may enhance the ability to, e.g., inspect, measure, determine gender, clean, vaccinate, process claws, process beaks, etc.

As used herein with respect to the restraint of live birds, the term "atraumatic restraint" (and variations thereof) means restraint that does not require puncturing the skin of the bird to restrain the bird.

Although the carriers and methods described herein may be used with birds of any age, they me particularly useful when used with hatchlings, where "hatchlings" are defined as young birds (e.g., chickens, turkeys, ducks, geese, etc.) with an age of one week or less.

In one aspect, a carrier apparatus for atraumatic restraint of a live bird as described herein comprises a torso support element shaped to support and atraumatically retain the torso of a live bird restrained in the carrier; a leg clamp apparatus operably attached to the torso support element, the leg clamp positioned to receive and atraumatically retain a thigh of a live bird restrained in the carrier, wherein the leg clamp apparatus comprises an open configuration in which the thigh can be positioned in the leg clamp apparatus and a closed configuration in which the thigh is retained in the leg clamp, and further wherein the thigh is retained in a selected angular orientation relative to the torso support element; a head support operably attached to the torso support element and positioned to receive a head of a bird restrained in the carrier with its chest supported against the torso support element; and a head clamp operably attached to the head support, wherein the head clamp and the head support cooperate to receive and atraumatically retain a head of a bird between the head clamp and the head support.

In some embodiments, the carrier apparatus described herein includes a leg clamp apparatus that is configured to receive and retain both the thigh of the left leg and the thigh of the right leg of the bird restrained in the carrier apparatus. In some embodiments, the leg clamp apparatus comprises a left leg clamp and a right leg clamp. In such an embodiment, the left leg clamp is operably attached to the torso support element and positioned to receive and retain the thigh of a left leg of a live bird restrained in the carrier, wherein the left leg clamp comprises an open configuration in which the thigh of the left leg can be positioned in the left leg clamp and a closed configuration in which the thigh of the left leg is retained in the left leg clamp, and further wherein the thigh of the left leg is retained in a first selected angular orientation relative to the torso support element; and the right leg clamp is operably attached to the torso support element, the right leg clamp positioned to receive and retain a thigh of a right leg of a bird restrained in the carrier, wherein the right leg clamp comprises an open configuration in which the thigh of the right leg can be positioned in the right leg clamp and a closed configuration in which the thigh of the right leg of a bird is retained in the right leg clamp, and further wherein the thigh of the right leg is retained in a second selected angular orientation relative to the torso support element.

In some embodiments, the first selected angular orientation of the left leg clamp and the second selected angular orientation of the right leg clamp are equivalent.

In some embodiments, the first selected angular orientation of the left leg clamp and the second selected angular orientation of the right leg clamp are different.

In some embodiments, the head support comprises: a first side facing the head of a bird restrained in the carrier; a second side facing away from the head of a bird restrained in the carrier; a beak receiving passage extending through the head support from on opening on the first side to an opening on the second side. The head support and the head clamp comprise an open configuration in which the beak of a bird restrained in the carrier can be moved into the beak receiving passage; and a closed configuration in which the head of a bird is retained by the head clamp and the head support such that at least a portion of the beak of the bird is located within the beak receiving passage and at least a portion of the beak of the bird is exposed proximate the opening of the beak receiving passage on the second side of the head support.

In some embodiments, the torso support element is pivotally attached to a base such that the torso support element can be rotated relative the base about an axis of rotation.

In some embodiments, the torso support element is pivotally attached to a base such that the torso support element can be rotated relative the base about an axis of rotation, wherein the torso support element and the base define an upright configuration and an inverted configuration, wherein rotation of the torso support element about the axis of rotation moves the torso support element between the upright configuration and the inverted configuration, wherein in the upright configuration the head clamp is located farther from the base than the leg clamp apparatus, and wherein in the inverted configuration the head clamp is located closer to the base than the leg clamp apparatus. In some embodiments, the axis of rotation about which the torso support element rotates is generally horizontal when the base is supported on a horizontal surface.

In some embodiments, the torso support comprises a leg separator proximate the leg clamp apparatus, wherein the leg separator restricts left-right movement of the rump of a bird restrained in the carrier apparatus by the leg clamp apparatus and the head support and the head clamp. In some embodiments, the leg separator comprises a loop extending from the torso support.

In some embodiments, the orientation of the head support is fixed relative to the torso support element.

In some embodiments, the torso support comprises an access opening positioned to expose a portion of the abdomen of a bird restrained in the carrier.

In some embodiments, in the closed configuration, the leg clamp apparatus acts on the thigh of the bird with a selected force that is independent of the size of the thigh.

In some embodiments, in the closed configuration, the leg clamp apparatus comprises a thigh opening that has a selected size.

In another aspect, embodiments of a method of atraumatically restraining a live bird in a carrier apparatus as described herein include: positioning the torso of a live bird proximate a torso support element of a carrier apparatus, wherein the torso support element is shaped to support and atraumatically retain the torso of the bird restrained in the carrier; atraumatically restraining the thigh of at least one leg of the bird in a leg clamp apparatus that is operably attached to the torso support element, wherein the thigh is atraumatically restrained in the leg clamp apparatus in a selected angular orientation relative to the torso support element; and atraumatically restraining the head of the bird against a head support operably attached to the torso support element, wherein a head clamp is operably connected to the head support and cooperates with the head support to receive and atraumatically retain the head of a bird between the head clamp and the head support.

In some methods, the thigh of the left leg of the bird and the thigh of the right leg of the bird are both atraumatically restrained in the leg clamp apparatus.

In some methods, the thigh of the left leg of the bird is restrained in a first angular orientation relative to the torso support element and the thigh of the right leg of the bird is restrained in a second angular orientation relative to the torso support element, and wherein the first angular orientation and the second angular orientation are equivalent.

In some methods, the thigh of the left leg of the bird is restrained in a first angular orientation relative to the torso support element and the thigh of the right leg of the bird is restrained in a second angular orientation relative to the torso support element, and wherein the first angular orientation and the second angular orientation are different.

In some methods, the torso support element is pivotally attached to a base, and wherein the method further comprises rotating the torso support element relative to the base about an axis of rotation, wherein the torso support element and the base define an upright configuration and an inverted configuration, wherein rotation of the torso support element about the axis of rotation moves the torso support element between the upright configuration and the inverted configuration, wherein in the upright configuration the head of the bird is located farther from the base than the legs of the bird, and wherein in the inverted configuration the head of the bird is located closer to the base than the legs of the bird.

In some methods, the axis of rotation is located proximate a breast of the bird.

In some methods as described herein, the method may include exposing at least a portion of the beak of the bird proximate a second side of the head support; wherein the head support comprises a first side facing the head of the bird restrained in the carrier and wherein the second side faces away from the head of the bird restrained in the carrier, wherein the head support further comprises a beak receiving passage extending through the head support from an opening on the first side to an opening on the second side.

In some methods, the method further comprises moving the carrier apparatus with the live bird restrained therein along the conveyor system.

In another aspect, some embodiments of a carrier apparatus for atraumatic restraint of a live bird include: a torso support element shaped to support the torso of a live bird restrained in the carrier; a left leg clamp operably attached to the torso support element, the left leg clamp positioned to receive and retain a thigh of a left leg of a live bird restrained in the carrier, wherein the left leg clamp comprises an open configuration in which the thigh of the left leg can be positioned in the left leg clamp and a closed configuration in which the thigh of the left leg is retained in the left leg clamp, and further wherein the thigh of the left leg is retained in a first selected angular orientation relative to the torso support element; a right leg clamp operably attached to the torso support element, the right leg clamp positioned to receive and retain a thigh of a right leg of a bird restrained in the carrier, wherein the right leg clamp comprises an open configuration in which the thigh of the right leg can be positioned in the right leg clamp and a closed configuration in which the thigh of the right leg of a bird is retained in the right leg clamp, and further wherein the thigh of the right leg is retained in a second selected angular orientation relative to the torso support element; a head support operably attached to the torso support element and positioned to receive and retain a head of a bird restrained in the carrier with its chest supported against the torso support element, wherein the head support comprises a first surface facing the head of a bird restrained in the carrier and a second surface facing away from the head of a bird restrained in the carrier; a beak receiving passage formed in the head support, wherein at least a portion of a beak on the head of a bird restrained in the carrier is exposed proximate the second surface of the head support; a head clamp operably attached to the head support, wherein the head clamp and the head support cooperate to receive and retain a head of a bird restrained in the carrier, wherein the head support and the head clamp comprise an open configuration in which the beak of a bird restrained in the carrier can be positioned in the beak receiving passage and a closed configuration in which the head of a bird is retained by the head clamp and the head support such that at least a portion of the beak of the bird is exposed proximate the second surface of the head support.

In another aspect, some embodiments of a method of atraumatically restraining a live bird include: positioning the torso of a live bird proximate a torso support element of a carrier apparatus, wherein the torso support element is shaped to support the torso of the bird restrained in the carrier; restraining the left leg of the bird in a left leg clamp that is operably attached to the torso support element, wherein the left leg clamp comprises an open configuration in which the thigh of the left leg can be positioned in the left leg clamp and a closed configuration in which the thigh of the left leg is retained in the left leg clamp, and further wherein the thigh of the left leg is retained in a first selected angular orientation relative to the torso support element; and restraining a right leg of the bird in a right leg clamp that is operably attached to the torso support element, wherein the right leg clamp comprises an open configuration in which the thigh of the right leg can be positioned in the right leg clamp and a closed configuration in which the thigh of the right leg of a bird is retained in the right leg clamp, and further wherein the thigh of the right leg is retained in a second selected angular orientation relative to the torso support element.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a leg clamp may refer to one or more leg clamps unless otherwise indicated.

The term "and/or" means one or all of the listed elements or a combination of any two or more of the listed elements.

The above summary is not intended to describe each embodiment or every implementation of the present invention. Rather, a more complete understanding of the carriers and methods described herein will become apparent and appreciated by reference to the following Description of Exemplary Embodiments and claims in view of the accompanying figures of the drawing.

BRIEF DESCRIPTION OF THE VIEWS OF THE DRAWING

The present invention will be further described with reference to the views of the drawing, wherein.

DESCRIPTION OF EXEMPLARY EMBODIMENTS

Figure 1:
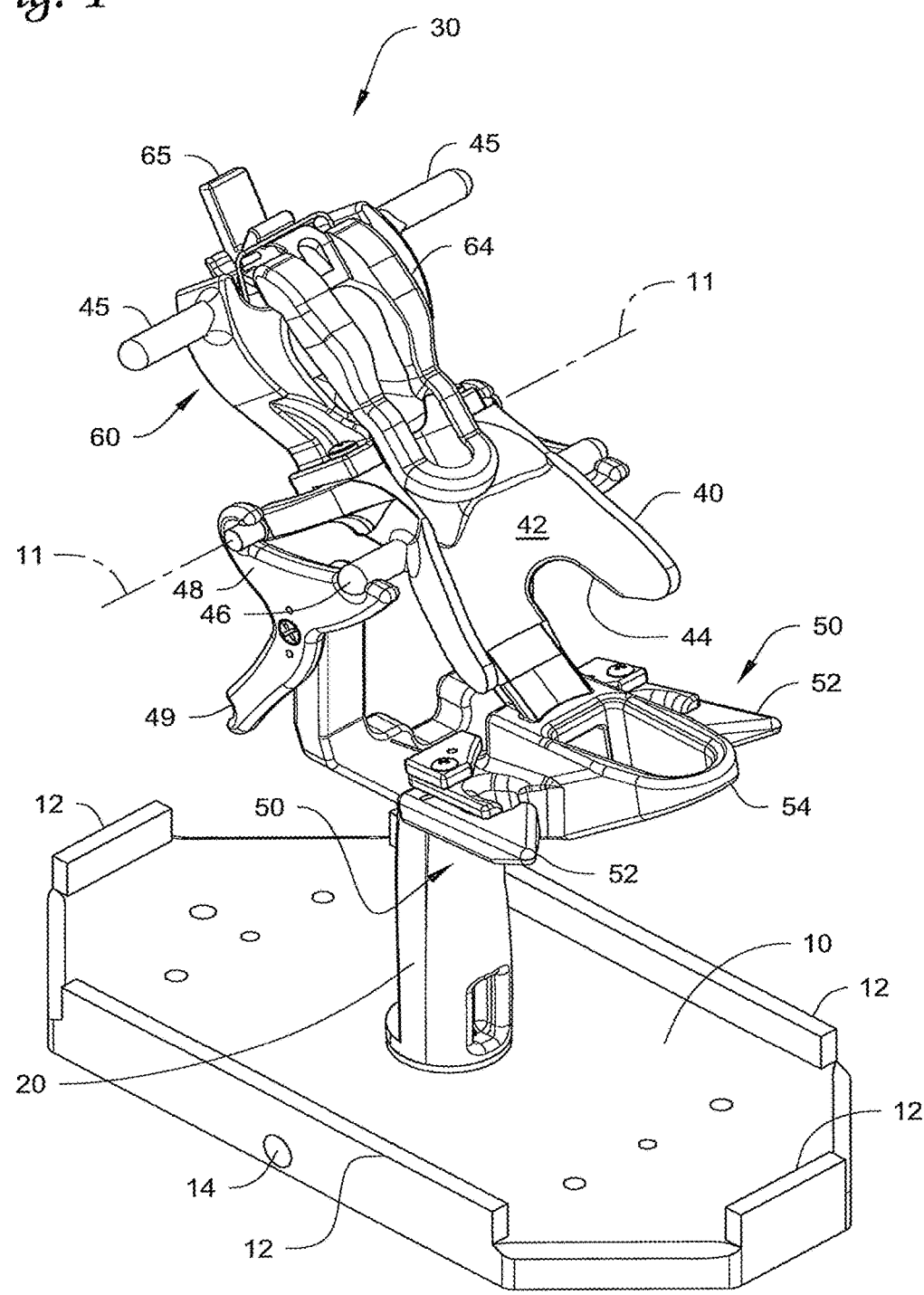
FIG. 1 is a perspective view of one exemplary embodiment of a bird carrier according to the present invention.

In the following detailed description of exemplary embodiments, reference is made to the accompanying figures of the drawing which form a part hereof, and in which are shown, by way of illustration, specific embodiments in which the carriers and methods described herein may be practiced. It is to be understood that other embodiments may be utilized and structural changes may be made without departing from the scope of the present invention.

As described herein, the bird carriers of the present invention may include a variety of features designed to assist in the transport and/or processing of the restrained birds in, for example, processing systems such as those described in U.S. Pat. No. 7,066,112, titled AUTOMATED POULTRY PROCESSING METHOD AND SYSTEM. The bird carriers of the present invention may also be used in other systems or environments where transport and/or processing of birds is performed.

Figure 2A:
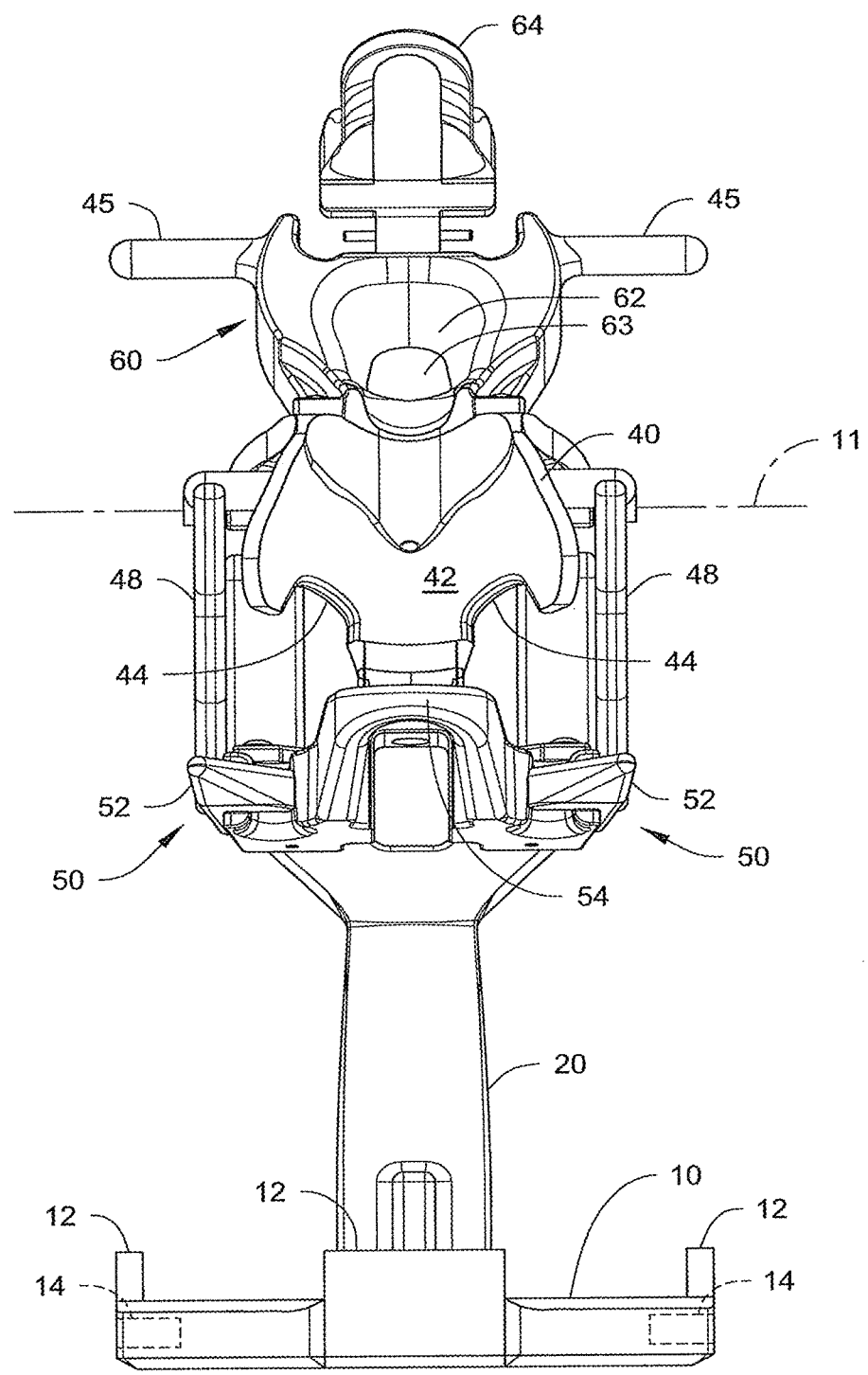
FIG. 2A is an end view of the bird carrier of FIG. 1 taken from the end closest to the leg clamps.
Figure 2B:
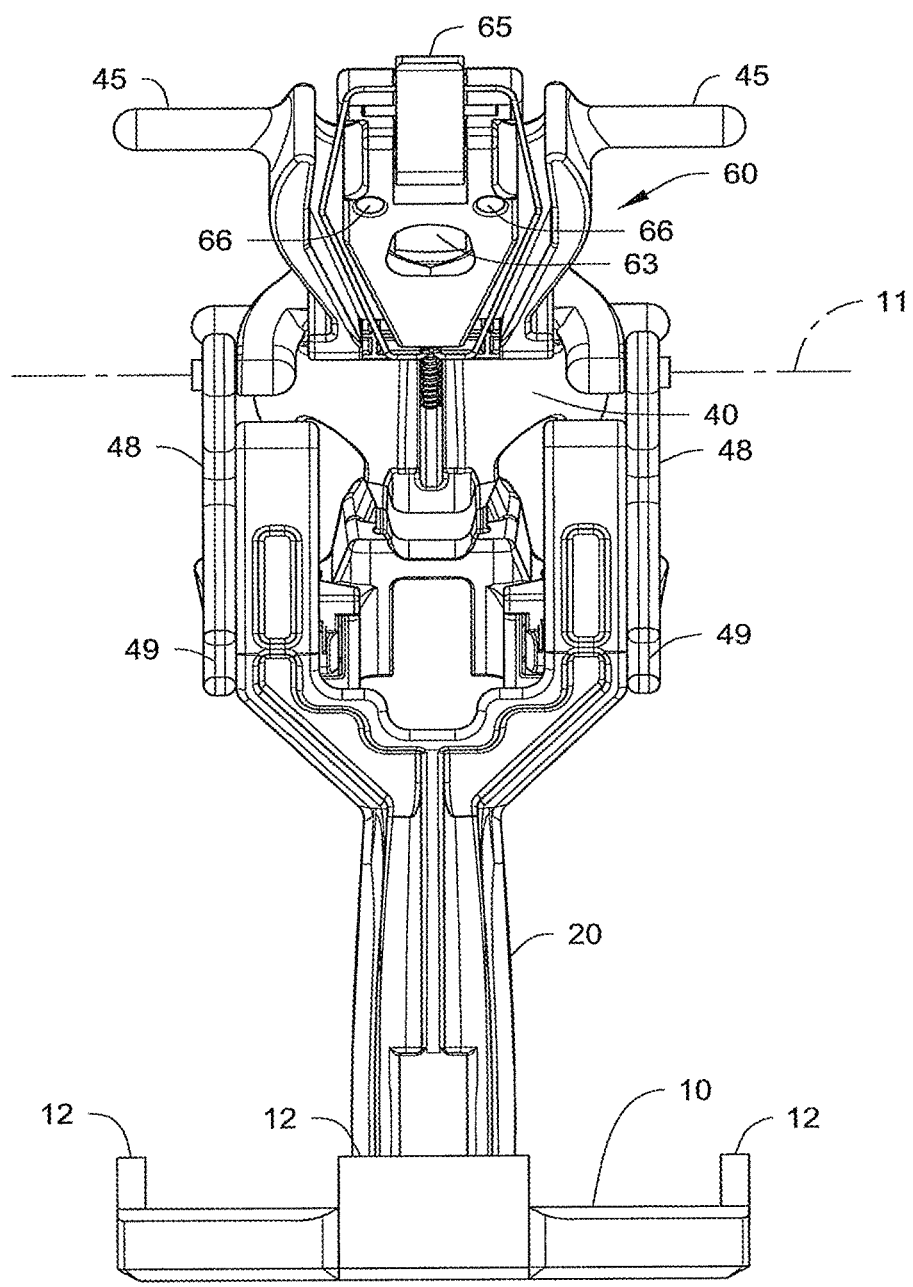
FIG. 2B is an end view of the carrier of FIG. 1 taken from the end farthest from the leg clamps.
Figure 3:
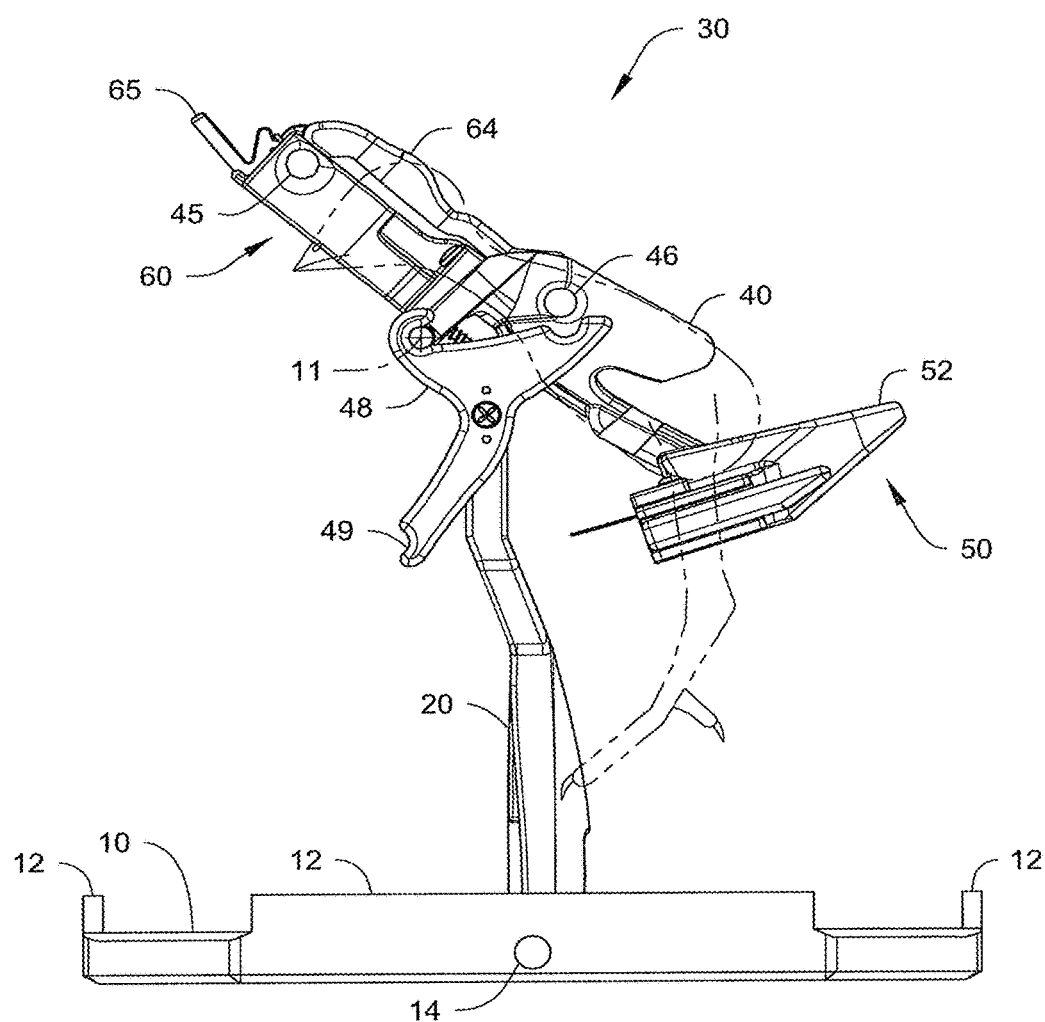
FIG. 3 is a side view of the bird carrier of FIG. 1, with a bird restrained therein in the upright orientation.
Figure 4:
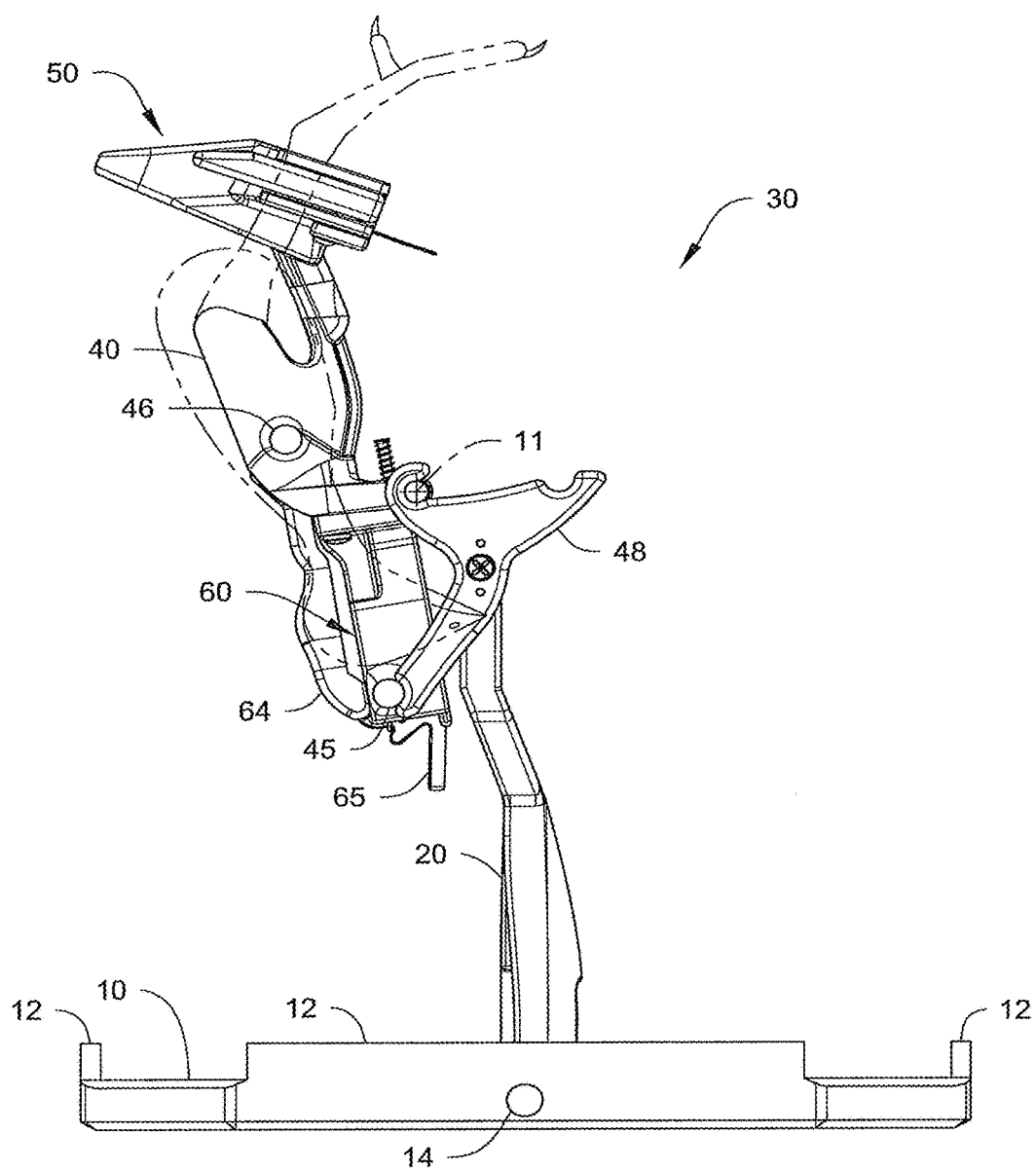
FIG. 4 is a side view of the bird carrier of FIG. 3 in which the bird is restrained in an inverted orientation.

One exemplary embodiment of a bird carrier according to the principles of the present invention is depicted in the perspective view of FIG. 1, end views in FIGS. 2A and 2B, and side views in FIGS. 3 and 4. The bird carrier 30 is operably supported above a base 10 by a post 20. The base 10 and support may be provided such that the bird carrier 30 can be used with conveyors and other transport systems.

The depicted bird carrier 30 also includes a torso support element 40, a leg clamp apparatus including one or more leg clamps 50 and an optional head support 60. The various components may be operably attached in a manner that provides for atraumatic restraint of a bird positioned in the bird carrier 30.

In at least some embodiments, the torso support element 40 includes a support surface 42 shaped to generally follow the anatomical shape of the torso of a bird located in the bird carrier 30 such that the torso of the bird is generally evenly supported. As a result, the shape of the support surface 42 may be different depending on the breed, age, gender, etc. of the birds that are to be restrained in the bird carrier 30. The torso support element 40 may include one or more openings 44 to expose the torso provide access to the abdomen of a bird positioned thereon such that various activities such as, e.g., injections, monitoring, etc. may be performed while the bird is atraumatically retained in the bird carrier 30.

The bird carrier 30 may also include a leg clamp apparatus with one or more leg clamps 50 positioned to restrain the legs of a bird having its torso supported by the torso support element 40. The leg clamps 50 may preferably be positioned to retain the leg of a bird on the thigh at a location above the joint commonly referred to as the "hock" joint. The leg clamps 50 may include arms 52 that move between open configurations in which the thighs of a bird can be positioned in the leg clamps and closed configurations in which the thighs of the bird are retained in the clamps 50. Although the depicted leg clamps 50 include arms 52, other structures (such as, e.g., inflatable bladders, etc.) may be used to retain a bird's thighs in the leg clamps when the clamps 50 are in the closed configuration.

The bird carrier 30 may include separate leg clamps 50 for each leg of a bird as in the depicted embodiment. Alternatively, the leg clamp apparatus may include a single leg clamp that is preferably capable of capturing and retaining at least one or preferably both legs of a bird. One potential advantage of separate leg clamps 50 is that they may potentially be used independently of each other such that one leg of the bird may be restrained first, followed by capture of the other leg.

The leg clamps 50 may be normally closed, but constructed such that they open in response to the forces generated as a leg is being inserted into the leg clamp 50 (the leg clamps 50 may be spring-loaded, etc.). In other embodiments, the leg clamps 50 may have defined open and closed configurations between which the clamps can be moved to accept and/or retain a leg of a bird being restrained.

The bird carrier 30 may also optionally include a leg separator 54 positioned between the legs of a bird contained in the bird carrier 30. The leg separator 54 may be used in connection with the leg clamps and the torso support element 40 to provide more accurate and repeatable positioning of the bird within the bird carrier 30. The leg separator 54 may also assist in positioning the legs of the bird to facilitate capture of the legs in the leg clamps 50.

The portion of the leg separator 54 facing upwards towards the torso support 40 and head support 60 may preferably be concave such that the rump of a bird restrained in the carrier 30 nests into the leg separator 54 to at least partially restrict movement of the restrained bird's rump side-to-side, i.e., in a direction extending between the leg clamps 50 in the depicted embodiment. The leg separator 54 depicted in FIGS. 1-4 includes a leg separator 54 in the form of an open loop, although in other embodiments, the leg separator 54 may be formed of any structure that provides a concave cavity into which the rump of the bird may nest to restrict movement of the rump.

The bird carriers 30 may also include a head support 60 operably attached to the torso support element 40 and positioned to support the head of a bird located in the bird carrier 30. The head support 60 includes a first side facing the head of a bird retained in the carrier. The head support 60 may preferably include a beak receiving passage 62 extending through the head support 60 to an opening 63 on the second side of the head support 60. The beak receiving passage 62 preferably extends through the head support 60 such that at least a portion of the beak of a bird retained in the bird carrier 30 extends through the opening 63 of the beak receiving passage 62 and is exposed proximate the second surface of the head support 60 (where the second side of the head support 60 faces away from the head of a bird retained in the bird carrier 30).

The head support 60 may include a head clamp 64 movable between an open configuration (see, e.g., FIG. 2A) and a closed configuration (see, e.g., FIGS. 1, 2B, 3, and 4). In the open configuration, the head clamp 64 is preferably positioned such that the head of a bird can be positioned in the head support 60 with the beak preferably extending through the beak receiving passage 62 and preferably protruding from the opening 63 on the second side of the head support 60. In the closed configuration, the head clamp 64 preferably functions to retain the head of a bird in the head support 60 such that its beak extends into the beak receiving passage 62 and preferably protrudes through the opening 63 on the second side of the head support.

In addition to the optional opening 63 for the beak of the restrained bird, the various components used to restrain the birds may also include additional openings to provide access to the nostrils, eyes, and other anatomical features of a bird restrained in the carrier 30. Referring, for example, to FIG. 2B, the head support 60 may include openings 66 sized and located to provide access to the eyes of a bird having its head restrained between the head support 60 and the head clamp 64. Although two openings 66 for the eyes are shown, in some embodiments only one eye opening may be provided.

The head clamp 64 may preferably be shaped such that portions of the bird's head are exposed to permit access for, e.g., injection devices, etc. In the depicted embodiment, the head clamp 64 preferably leaves the central portion of the back of the bird's head exposed. The head clamp 64 may preferably extend far enough towards the legs of the bird such that it is capable of restraining the neck of the bird when the head clamp 64 is in the closed configuration. In some embodiments, the clamp 64 may include surfaces, openings, etc. designed to guide a device to a selected location on a bird's head.

Structures similar to the head support 60 and related components may be described in, e.g., U.S. Pat. No. 5,651,731 titled METHOD AND APPARATUS FOR DEBEAKING POULTRY; U.S. Pat. No. 7,232,450 titled APPARATUS AND METHOD FOR UPPER AND LOWER BEAK TREATMENT; U.S. Patent Application Publication US 2005/0101937 A1 titled APPARATUS AND METHOD FOR NASAL DELIVERY OF COMPOSITIONS TO BIRDS; U.S. Pat. No. 7,363,881 titled BEAK TREATMENT WITH TONGUE PROTECTION; etc.

The bird carrier 30 may include a base 10, with the torso support element 40 and the base 10 being operably attached to each other in a manner that allows the torso support element 40 to be moved between two or more different orientations or configurations relative to the base 10. In the depicted embodiment, the torso support element 40 is attached to the base 10 using a post 20 or other support structure, although other attachment structures may be used. The different orientations or configurations may provide for improved access to different portions of the bird's anatomy such that different procedures may be facilitated. In other words, a portion of a bird's anatomy may be more easily accessed if the bird is in one or more selected orientations.

The torso support element 40 can preferably move between and be held in, e.g., an upright configuration (as depicted in, e.g., FIGS. 1, 2 and 3) and an inverted configuration (as depicted in, e.g., FIG. 4). Although these two configurations are depicted, other intermediate configurations may also be used (where, e.g., the bird is held in supine or prone position). Movement between the two configurations may be accomplished by. e.g., rotating the torso support element 40 and the base 10 relative to each other. In the upright configuration (see, e.g., FIG. 3), the head clamp 64 (and/or the portion of the torso support element 40 located proximate a restrained bird's head) is farther from the base 10 than the leg clamp 50. In the inverted configuration (e.g., FIG. 4), the head clamp 64 (and/or the portion of the torso support element 40 located proximate a restrained bird's head) is located closer to the base 10 than the leg clamp 50.

As discussed herein, movement of the torso support element 40 between the upright and inverted configurations may be accomplished, in some embodiments, by rotating the torso support element 40 and the base 10 relative to each other (although it may be typical to rotate the torso support element 40 while the base 10 remains relatively stationary). The carriers 30 may include torso support elements 40 that are designed to rotate about a wide variety of angles, e.g., horizontal axes, vertical axes, canted axes, etc. One potentially useful axis of rotation may include, e.g., axis 11 as seen in FIGS. 1-4.

The carrier 30 includes some potentially useful features to assist in rotation of the torso support element 40 about axis 11. In the depicted embodiment, an actuator pin 45 extends from the head support 60 (although in other embodiments it may, e.g., extend from the torso support element 40) and is positioned to allow for movement by an external arm to rotate the torso support element 40 about axis 11.

Rotation of the torso support element 40 about axis 11 may be limited in a first direction by a stop pin 46 that protrudes from the torso support element 40. The stop pin 46 may preferably act against a stop surface on carriage 48 that supports the torso support element 40. The same stop pin 46 (or a different feature) could, in some embodiments, be used to limit rotation of the torso support element 40 when in the selected inverted configuration where the stop pin 46 would act against another stop surface on the carriage 48. In the depicted embodiment, rotation of the torso support element 40 about axis 11 in a direction opposite the first direction is limited by actuator pin 45 acting on a stop surface 49 on the carriage 48.

In the depicted embodiment, rotation of the torso support 40 is limited using actuator pin 45 and stop pin 46. It should be understood that the actuator pin 45 and stop pin 46 represent only an example of the myriad of structures that could be used to facilitate movement of the torso support element 40.

In addition to providing for automated processing to move the torso support element 40 between the upright and inverted configurations, other structures may be provided to facilitate use of the carrier 30 in an automated conveyor system. For example, the carrier 30 may include a tab 65 associated with the head clamp 64 that can be used to move the head clamp 64 between its open and closed configurations. In a similar manner, the leg clamps 50 may include release structures adapted to open the leg clamps 50. The release structures may be constructed such that, in response to pressure, the leg clamps 50 rotate into an open position from a normally closed position (where, e.g., the leg clamps 50 may be biased by, e.g., a spring or other resilient member, etc.).

As described herein, the bird carrier 30 may be support above a base 10, where the base 10 is adapted for use in transporting a bird through an automated conveying system. By providing a base 10 adapted for conveying, the bird carriers 30 may preferably be efficiently transported using conveying equipment. For example, the bird carriers 30 (with or without bases 10 and/or supports 20) may be used in connection with the automated processing systems described in, e.g., U.S. Pat. No. 7,066,112, titled AUTOMATED POULTRY PROCESSING METHOD AND SYSTEM.

Another optional feature depicted in connection with FIG. 1 is an identification tag 14 that may be associated with the bird carriers 30. In the depicted embodiment the identification tag 14 is embedded in or otherwise attached to the base 10, although it may be attached to any portion of the poultry carrier 30 (e.g., the support 20, torso support 40, leg clamps 50, head support 60, etc.). As seen in, e.g., FIG. 2A, the base 10 may, in some embodiments use two identification tags 14. The use of two (or more) tags 14 can be helpful to detect an orientation of the base 10 in, for example, a conveying system. For example, one of the tags 14 could provide an indication that it is on the right side of the base 10 while the other tag 14 could provide an indication that it is on the left side of the body 10. Other variations are also possible, e.g., tags on the front and back edges of the base 10, on the carriage 48, on the torso support element 40, etc.

The identification tag 14 may take any form or combination of forms capable of identifying the bird carrier 30, e.g., bar codes, radio frequency identification (RFID) tags, alphanumeric indicia, etc. The identification tag or tags associated with the bird carriers 30 may be particularly useful in automated processing systems such as those described in, e.g., U.S. Pat. No. 7,066,112.

The bird carriers 30 (as well as the base 10 and/or support 20) may also include one or more alignment features such that accurate location of the birds within other equipment may be obtained using automated equipment. Accurate alignment may be beneficial for some processes such as, e.g., injections, beak modification, claw modification, gender identification, etc. The alignment features may operate using any modality, e.g., optically, magnetically, ultrasonically, mechanically, etc., or even combinations of two or more modalities (to e.g., provide redundancy).

One example of a potentially useful set of alignment indicators that rely on mechanical positioning may include sockets capable of receiving an alignment pin. The sockets may be tapered in shape such that the movement of a pin into the sockets can also serve to complete the alignment process. It should be understood that the carriers could also or alternatively include pins with external structures including the sockets need to accomplish the alignment function. The alignment structures in the form of sockets could be provided in any suitable location on the carrier, e.g., on any surface of the base 10, head support 60, torso support element 40, support 20, carriages 48, etc.

Other alignment and/or transport features that may be provided on the base 10. For example, the base 10 may include one or more chamfered corners—with the depicted base 10 being generally rectangular with four chamfered corners. Another potential feature may include rails 12 that can be used to determine positioning of the base (using e.g., a photocell, etc.), to handle the base 10 (by, e.g., providing a convenient location for grasping by a robotic arm, etc.), etc. Other optional features may include the use of magnetic material in the base 10 that can be used for positioning the base 10, propulsion of the base 10 (using a cooperating magnetic drive system), etc.

Figure 5:
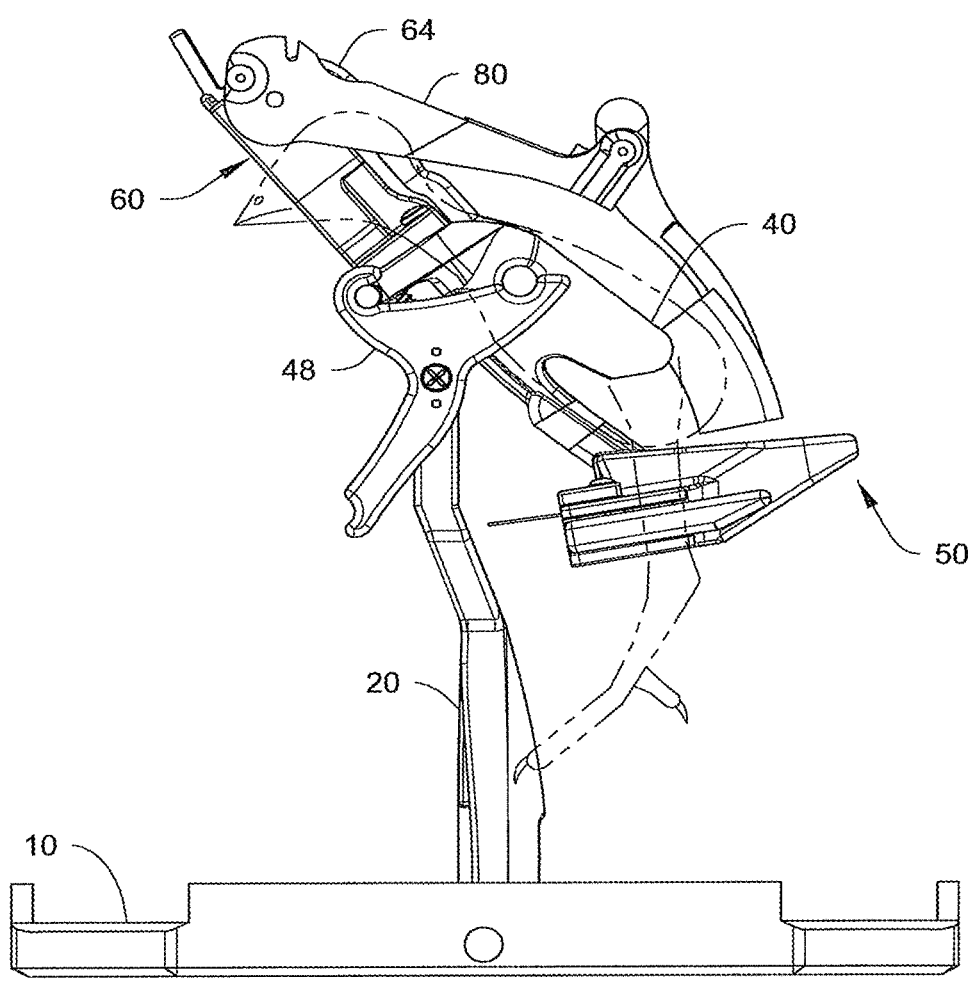
FIG. 5 is a side view of a bird carrier including an optional torso clamp.

An alternate embodiment is depicted in FIG. 5 in which the carrier 30 includes an optional torso clamp 80 operably connected to the torso support element 40. The torso clamp 80 and the torso support element 40 preferably cooperate to receive and retain a torso of a bird restrained in the carrier 30. The torso support element 40 and the torso clamp include an open configuration in which the torso of a bird restrained in the carrier 30 can be positioned in the torso support element 40 and a closed configuration in which the torso of a bird is retained in contact with the torso support element 40.

Figure 6:
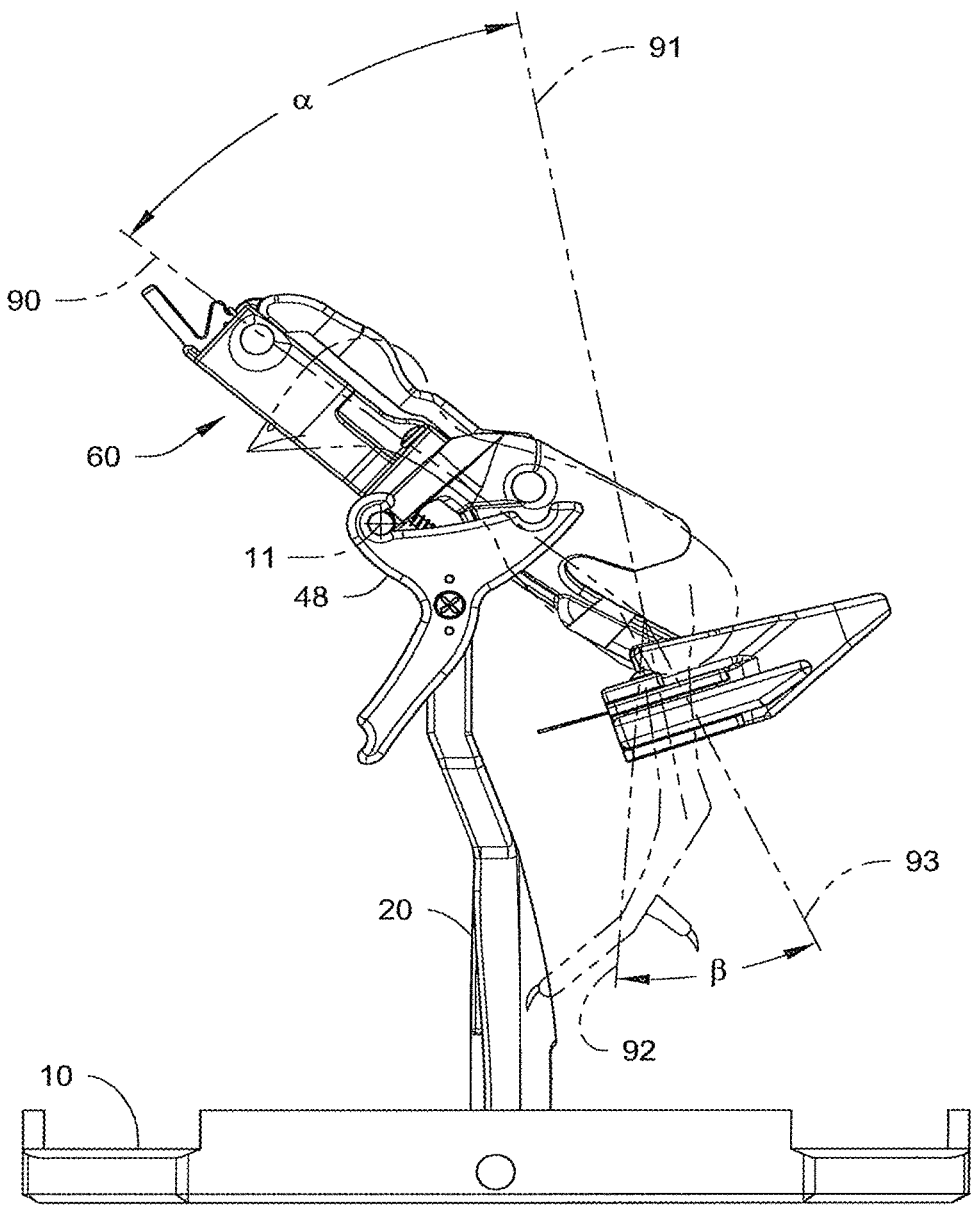
FIG. 6 is a side view of a carrier with markings to identify potential angular relationships between the leg clamps and torso support element.

It may be preferred that the torso support element and the leg clamps cooperate to retain the thighs of a bird retained within the bird carrier in a selected angular orientation relative to the torso support element. The selected angular orientation may be chosen to facilitate loading and/or transport of the birds in the bird carriers. Referring to FIG. 6, for example, the selected angular orientation is indicated by angle α (alpha) and may range from, e.g., zero degrees or more to, e.g., 15 degrees or more, 30 degrees or more, 45 degrees or more, 60 degrees or more, or 75 degrees or more. The torso support element and the leg clamps may be positioned such that the selected angular orientations of the bird's left and right legs are the same or different.

Another optional feature that may be provided in connection with the present invention is a selectable aperture assembly that may be provided in connection with the head support 60. A selectable aperture assembly may be used to change the size of the opening 63 in the beak receiving passage 62 such that a selected amount of a bird's beak extends through the opening 63 and is exposed proximate the second side of the head support 60. It may be desirable to change the size of the opening based on a variety of factors such as, e.g., species, age, gender, equipment used to treat the protruding portion of the beaks, etc.

In a simple form, the selectable aperture assembly may be provided as a structure that can be positioned over the opening 63 to reduce the size of a beak that can extend therethrough. Embodiments may include, for example, a plate with a smaller opening placed over the second side of the head support 60, fingers that can be advanced toward a center of the opening 63, a sleeve that can be inserted into the beak receiving passage 62 (from, e.g., the same side through which a bird's head enters the passage 62), etc. In some instances, the structure may provide an opening 63 with a fixed size (i.e., a size that cannot be adjusted) and in other instances, the structure may be adjustable between two or more aperture sizes (e.g., in the form of a continuously adjustable aperture such as that found in a camera lens).

In the depicted embodiment, the selectable aperture assembly 100 may be provided in the form of an arm that can be moved into position over the opening 63 (not shown). The specific exemplary structure includes three arms 102a, 102b, 102c, each of which includes an opening 63a, 63b, 63c. The arms 102a, 102b, 102c can be selectively positioned such that a selected opening 63a, 63b, 63c can be placed over the second side of the head support 60. In the selectable aperture assembly 100 depicted in FIG. 7, the arms 102a, 102b, 102c and their respective openings 63a, 63b, 63c also change the depth or thickness of the head support 60 (i.e., the distance between the first side of the head support (the side facing the bird) and the second side (the side facing away from the bird). Further, the arms 102a, 102b, 102c and their respective openings 63a, 63b, 63c of the selectable aperture assembly 100 depicted in FIG. 7 can be used in combination, although this may not be required.

Figure 7:
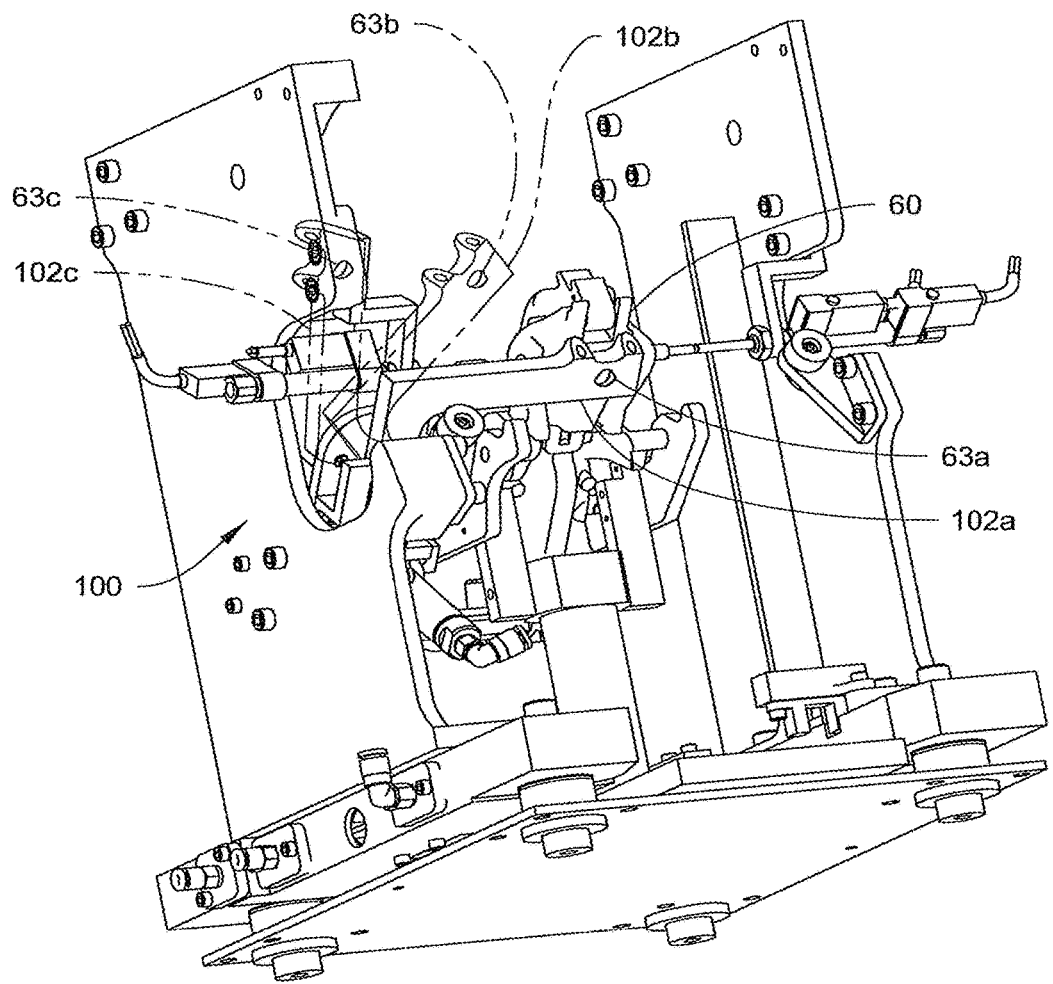
FIG. 7 is a perspective view of one selectable aperture assembly that may be used in connection with the bird carriers.
Figure 8:
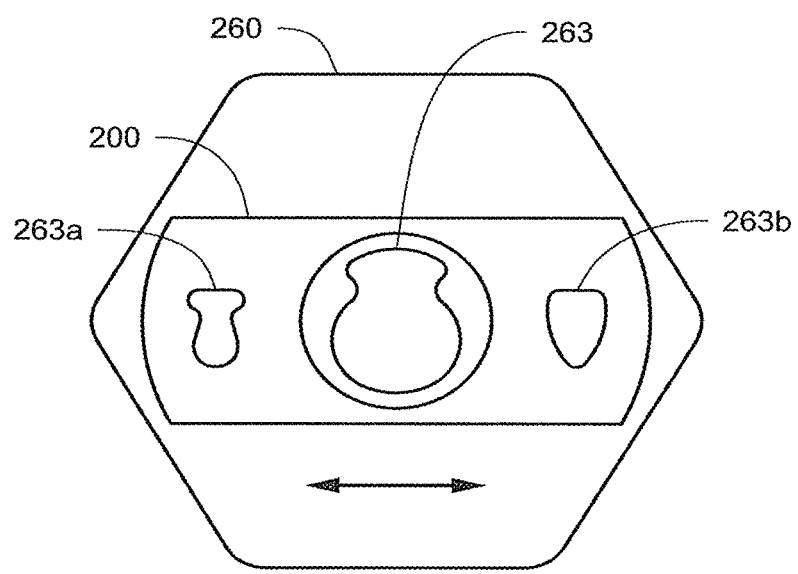
FIG. 8 depicts another version of a selectable aperture assembly.

The depicted selectable aperture assembly 100 is provided on a station 110 into which the bird carrier 30 is advanced. The selectable aperture assemblies may, however, be provided as a part of the bird carrier 30. One example of such an embodiment is depicted in connection with FIG. 8 in which the second side of a head support 260 is depicted. A selectable aperture assembly in the form of a plate 200 is positioned over the second side of the head support 260. The aperture 263 of the passage formed through the head support 260 is exposed through an opening 201 in the plate 200. The plate 200 also includes selectable openings 263a and 263b that may be smaller than opening 263 and/or have a different shape. The size and/or shape of the opening 263 can be adjusted by moving the plate 200 such that one of the selectable openings 263a or 263b is positioned over the primary opening 263 in the second side of the head support 260. The plate 200 may, for example, move within channels or some other structure (not shown). There are, of course a myriad of structures that can be used to provide a selectable aperture assembly, and the forms depicted in FIGS. 7 and 8 are only two examples.

The bird carriers and related components may be manufactured of any suitable materials, e.g., metals, plastics, etc. In some instances, it may be beneficial if the materials have selected physical characteristics, such as, e.g., electrical conductivity, thermal conductivity, etc.

The complete disclosure of the patents, patent documents, and publications cited in the Background, the Description of Exemplary Embodiments, and elsewhere herein are incorporated by reference in their entirety as if each were individually incorporated.

Exemplary embodiments of the carriers and methods described herein have been discussed and reference has been made to possible variations. These and other variations and modifications will be apparent to those skilled in the art without departing from the scope of the invention, and it should be understood that this invention is not limited to the illustrative embodiments set forth herein. Accordingly, the invention is to be limited only by the claims provided below and equivalents thereof.

The invention claimed is:

1. A carrier apparatus for restraint of a live bird, the apparatus comprising:
a torso support element shaped to support and retain the torso of a live bird restrained in the carrier;
a leg clamp apparatus operably attached to the torso support element, the leg clamp positioned to receive and retain a thigh of a live bird restrained in the carrier, wherein the leg clamp apparatus comprises an open configuration in which the thigh can be positioned in the leg clamp apparatus and a closed configuration in which the thigh is retained in the leg clamp;
a head support operably attached to the torso support element and positioned to receive a head of a bird restrained in the carrier with its chest supported against the torso support element; and
a head clamp operably attached to the head support, wherein the head clamp and the head support cooperate to receive and retain a head of a bird between the head clamp and the head support.

2. A carrier apparatus according to claim 1, wherein the leg clamp apparatus is configured to receive and retain both the thigh of the left leg and the thigh of the right leg of the bird restrained in the carrier apparatus.

3. A carrier apparatus according to claim 2, wherein the leg clamp apparatus comprises a left leg clamp and a right leg clamp;
wherein the left leg clamp is operably attached to the torso support element and positioned to receive and retain the thigh of a left leg of a live bird restrained in the carrier, wherein the left leg clamp comprises an open configuration in which the thigh of the left leg can be positioned in the left leg clamp and a closed configuration in which the thigh of the left leg is retained in the left leg clamp;
and wherein the right leg clamp is operably attached to the torso support element, the right leg clamp positioned to receive and retain a thigh of a right leg of a bird restrained in the carrier, wherein the right leg clamp comprises an open configuration in which the thigh of the right leg can be positioned in the right leg clamp and a closed configuration in which the thigh of the right leg of a bird is retained in the right leg clamp.

4. A carrier apparatus according to claim 3, wherein the first selected angular orientation of the left leg clamp and the second selected angular orientation of the right leg clamp are equivalent.

5. A carrier apparatus according to claim 3, wherein the first selected angular orientation of the left leg clamp and the second selected angular orientation of the right leg clamp are different.

6. A carrier apparatus according to claim 1, wherein the head support comprises:
a first side facing the head of a bird restrained in the carrier;

a second side facing away from the head of a bird restrained in the carrier;

a beak receiving passage extending through the head support from an opening on the first side to an opening on the second side;

and wherein the head support and the head clamp comprise:

an open configuration in which the beak of a bird restrained in the carrier can be moved into the beak receiving passage; and a closed configuration in which the head of a bird is retained by the head clamp and the head support such that at least a portion of the beak of the bird is located within the beak receiving passage and at least a portion of the beak of the bird is exposed proximate the opening of the beak receiving passage on the second side of the head support.

7. A carrier apparatus according to claim 1, wherein the torso support element is pivotally attached to a base such that the torso support element can be rotated relative the base about an axis of rotation.

8. A carrier apparatus according to claim 1, wherein the torso support comprises a leg separator proximate the leg clamp apparatus, wherein the leg separator restricts left-right movement of the rump of a bird restrained in the carrier apparatus by the leg clamp apparatus and the head support and the head clamp.

9. A carrier apparatus according to claim 8, wherein the leg separator comprises a loop extending from the torso support.

10. A carrier apparatus according to claim 1, wherein the orientation of the head support is fixed relative to the torso support element.

11. A carrier apparatus according to claim 1, wherein the torso support comprises an access opening positioned to expose a portion of the abdomen of a bird restrained in the carrier.

12. A carrier apparatus according to claim 1, wherein, in the closed configuration, the leg clamp apparatus acts on the thigh of the bird with a selected force that is independent of the size of the thigh.

13. A carrier apparatus according to claim 1, wherein, in the closed configuration, the leg clamp apparatus comprises a thigh opening that has a selected size.

14. A method of restraining a live bird in a carrier apparatus, the method comprising:

positioning the torso of a live bird proximate a torso support element of a carrier apparatus, wherein the torso support element is shaped to support and retain the torso of the bird restrained in the carrier;

restraining the thigh of at least one leg of the bird in a leg clamp apparatus that is operably attached to the torso support element; and restraining the head of the bird against a head support operably attached to the torso support element, wherein a head clamp is operably connected to the head support and cooperates with the head support to receive and retain the head of a bird between the head clamp and the head support.

15. A method according to claim 14, wherein the thigh of the left leg of the bird and the thigh of the right leg of the bird are both restrained in the leg clamp apparatus.

16. A method according to claim 15, wherein the thigh of the left leg of the bird is restrained in a first angular orientation relative to the torso support element and the thigh of the right leg of the bird is restrained in a second angular orientation relative to the torso support element, and wherein the first angular orientation and the second angular orientation are equivalent.

17. A method according to claim 15, wherein the thigh of the left leg of the bird is restrained in a first angular orientation relative to the torso support element and the thigh of the right leg of the bird is restrained in a second angular orientation relative to the torso support element, and wherein the first angular orientation and the second angular orientation are different.

18. A method according to claim 14, wherein the method comprises exposing at least a portion of the beak of the bird proximate a second side of the head support;

wherein the head support comprises a first side facing the head of the bird restrained in the carrier and wherein the second side faces away from the head of the bird restrained in the carrier, wherein the head support further comprises a beak receiving passage extending through the head support from an opening on the first side to an opening on the second side.

19. A method according to claim 14, wherein the method further comprises moving the carrier apparatus with the live bird restrained therein along the conveyor system.

* * * * *